Dec. 31, 1940.  C. E. WOOD  2,226,887
FLEXIBLE DRIVE TENSION MEANS
Filed March 15, 1939  7 Sheets-Sheet 3

Dec. 31, 1940.  C. E. WOOD  2,226,887
FLEXIBLE DRIVE TENSION MEANS
Filed March 15, 1939  7 Sheets-Sheet 7

Inventor
Carl E. Wood,
By
Attorney

Patented Dec. 31, 1940

2,226,887

UNITED STATES PATENT OFFICE 2,226,887

FLEXIBLE DRIVE TENSION MEANS

Carl E. Wood, Milwaukee, Wis.

Application March 15, 1939, Serial No. 261,969

7 Claims. (Cl. 105—106)

My invention relates to means more especially adapted for driving the generators of railroad passenger cars from the axles and has for its object the provision of means which will permit the generator and appurtenances to be centrally mounted on the car truck frame and hence eliminate the element of unbalance encountered with the present day type of truck hung generators.

My invention contemplates means for effecting suitable driving relation between the axle driven member or pulley and the generator armature which permits selection of the desired overall drive ratio where restrictions prevent it to be accomplished with pulleys; the elements for providing the desired drive ratio being all incorporated in a single unit or housing and permit the use of stock generators of standard speeds without the necessity of using special designs with the gear ratios incorporated in the generators themselves.

The invention also has for its object the provision of a device involving a lesser number of parts; which will subject the drive belts or flexible driving elements to less weight and strains; a device which will compensate for changing drive centers—which will maintain uniform belt tension; a device which will enable selection of over-all drive ratios that permit establishing desirable belt speeds and which will permit the entire assembly to be disconnected and removed from the generator when employed in connection with the operation of the latter.

The above enumerated objects as well as others and the advantages inherent in my invention will all be readily comprehended from the following detailed description of the accompanying drawings, wherein.

My invention, as previously stated, is devised to overcome some of the objections encountered with the methods heretofore employed for obtaining electric power in railroad passenger cars.

A common method heretofore employed involved the use of a generator suspended under the body of the car and driven by means of a flat belt from a pulley mounted on the nearest car axle; the generators being suspended in such manner that the tension on the belt was maintained both through the weight of the generator itself and through an auxiliary spring.

With the advent of air conditioning, requiring larger generators, it no longer was possible to allow the generator to weigh into the belt to maintain the required tension and, therefore, was found desirable to mount the units rigidly on the car body underframe or upon the car truck.

In the first method of mounting, the generator on the car body, the common practice involved a drive by means of flat or V-type belts and a jack shaft mounted on the truck and provided with beveled gears and thence through a splined universal shaft to the generator.

In the last mentioned arrangement where the generators were mounted on the truck with the armature shaft commonly disposed parallel with the car axle, a movable jack shaft was required to maintain the belt tension and, therefore, was connected to the armature through a splined universal shaft.

Both of the last mentioned arrangements have advantages over the original method mentioned in that there is less weight in the jack shaft assembly for the belt to move when the belt center distance is altered due to relative movement between the truck and the axle. Such movement, however, constitutes a shock transmitted to the belt and contributes to its short life.

The truck-hung method possesses the greater advantage due to less weight, but the assembled unit requires most of the width of the truck and with the generator mounted off the center line of the truck contributes an element of unbalance.

Figure 1:
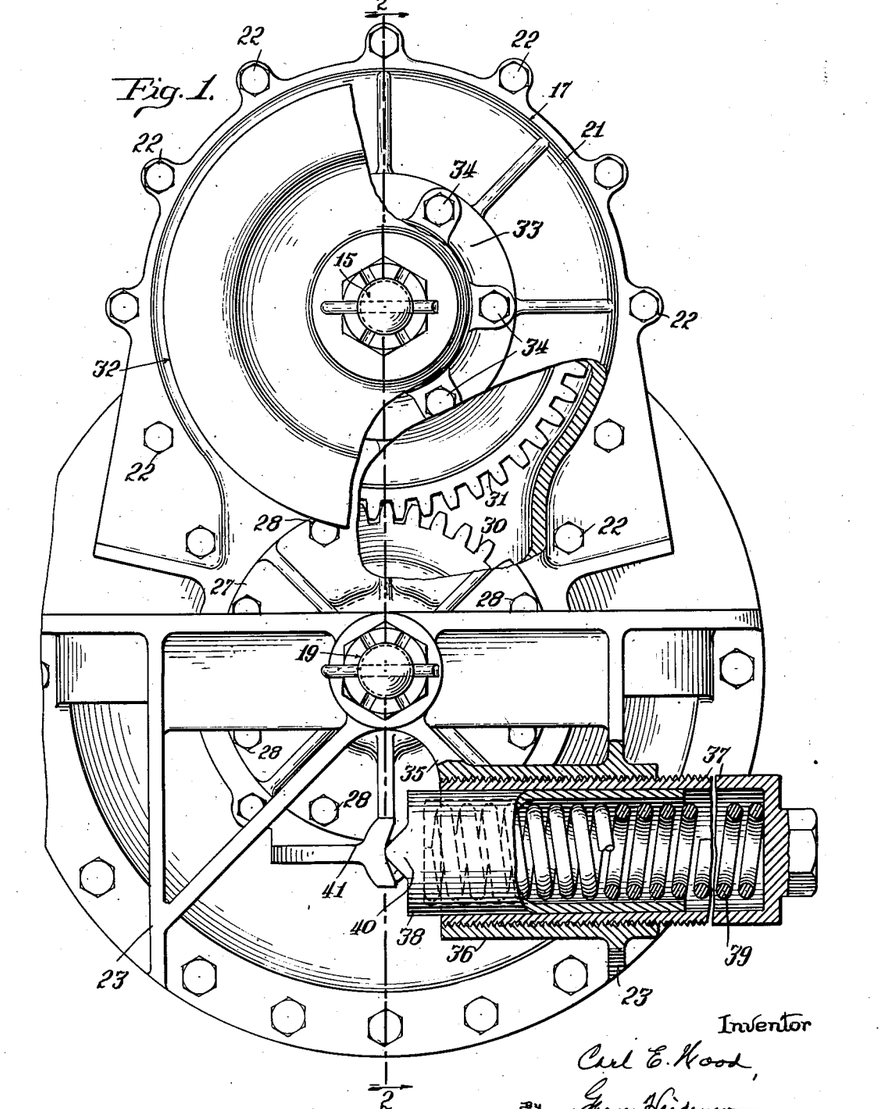
Figure 1 is a side elevation of one form of my improved means with portions broken away and shown in section to show internal construction.
Figure 2:
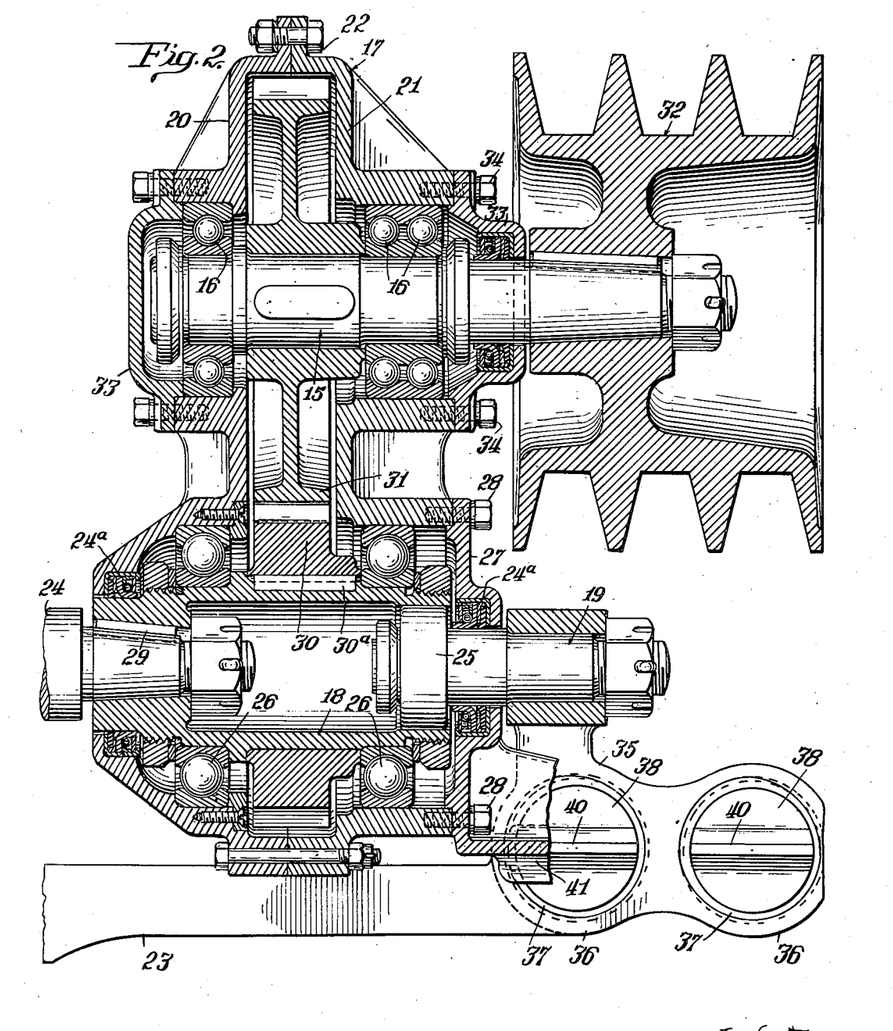
Figure 2 is a vertical sectional view taken on the line 2—2 of Figure 1, looking in the direction of the arrows.

My invention is devised to minimize the objections and weight on the belts and permit the generator and associated elements to be centrally secured to the car truck frame; the embodiment of the invention as disclosed in the first two figures of the drawings contemplates driving the generator by means of a belt, or group of belts, from a suitable pulley on the car axle to a pulley on a jack shaft in the usual manner heretofore employed.

The jack shaft 15 is mounted by means of suitable anti-friction bearings 16, 16 in a housing 17 which is formed to also provide proper bearings for a shaft extension 18 and a rigid support shaft 19. The housing 17 preferably consists of two side walls 20 and 21, shown secured together by a series of bolts 22 and formed to provide annular chambers for the reception of gears as hereinafter described. The housing 17 is rotatably mounted on the rigid support shaft 19 which latter is supported at its outer end by a bracket 23 which is suitably fastened to the head of the generator, not shown, as the generator may be of the usual construction employed for this purpose. The shaft extension 18 is hollow and adapted at one end to receive the generator armature shaft, a portion whereof is shown at 24, while the other end receives the rigid support shaft 19, see Figure 2; the shaft extension and rigid support shaft being preferably provided with dirt excluding oil seals as at 24ª; while the rigid support shaft 19 is also provided with an outboard support bearing 25 for supporting the adjacent end of the hollow shaft extension 18. The housing 17 is provided with ball bearing supports 26, 26, disposed about the ends of the shaft extension 18, so as to permit rotation of the housing. In order to permit insertion and removal of the rigid support shaft 19, the housing side wall 21 is shown provided with a removable plate 27 held in place by bolts 28.

The hub end of the shaft extension 18 is shown keyed at 29 to the armature shaft 24, while the intermediate part of the shaft extension has a gear 30 keyed thereto at 30ª so as to induce rotation of the shaft extension and armature shaft when the gear 30 is rotated by means of the meshing gear 31.

Gear 31 is properly secured or keyed on the jack shaft 15 so as to rotate therewith; the jack shaft at its outer end being provided with a pulley 32 which latter is driven by suitable belts driven from a pulley arranged on the axle of the car and not shown. The pulley 32, in keeping with the pulley on the car axle, may be adapted for a single belt or for a multiple of belts as shown in Figure 2; the pulley 32 being shown keyed on the end of the jack shaft and removably held in place. To enable proper assembly I show the side walls 20 and 21 of the housing provided with removable plates 33, 33 held in place by bolts 34.

With the armature shaft extension 18 and the rigid support shaft 19 arranged in alignment with each other, it is apparent that the housing 17 is free to rotate about the axis of the armature shaft; and as the jack shaft 15 with the driven pulley 32 is carried by the upper end of the housing, means are thus provided for taking up the belt slack and also to permit movement of the jack shaft and driven pulley when the belt center distance is altered during relative movement between car truck and car axle.

In order to maintain proper tension in the driving belt or belts, I provide adjustable spring tension mechanism consisting of a bracket 35 extending from the outboard support bracket 23 and terminating in a horizontally disposed cylindrical socket or sleeve 36, which is internally threaded to receive an externally threaded cylinder 37, shown closed at its outer end, while its open end receives a slidable cylinder or cap member 38. A suitable coil spring 39 is mounted in the telescopically arranged cylindrical members 37, 38; the coil spring being held under compression by the closed ends of the cylinders 37, 38, as shown in Figure 1.

The outer closed end of the slidably mounted cylinder 38 is shown provided with a suitable boss or extension 40, adapted to be engaged by a bracket 41 which extends laterally from the housing 17, namely in a direction substantially parallel with the axes of the aligned armature shaft extension 18 and rigid support shaft 19, which constitute the axis for the rotatable housing.

The tension of the spring 39 and the degree of normal tilt of the upper end of the housing in a direction away from the car axle and hence the normal tension on the driving belt or belts is controlled by screwing the cylindrical housing 37 further into bracket member 36 to increase the tension, or screwing housing member 37 outwardly to decrease the spring tension; and as the spring 39 constantly presses cylindrical member 38 outwardly, the latter is forced against the bracket 41 of the jack shaft carrying housing 17, and causes the upper jack shaft holding portion of the housing to swing toward one side of the vertical plane of the support shaft 19.

In order to facilitate spring tension regulation, the outer end of the cylindrical housing member 37 may be provided with suitable tool gripping surfaces; and if desired a pair of spring carrying housings 37 and 38 may be employed.

Figure 3:
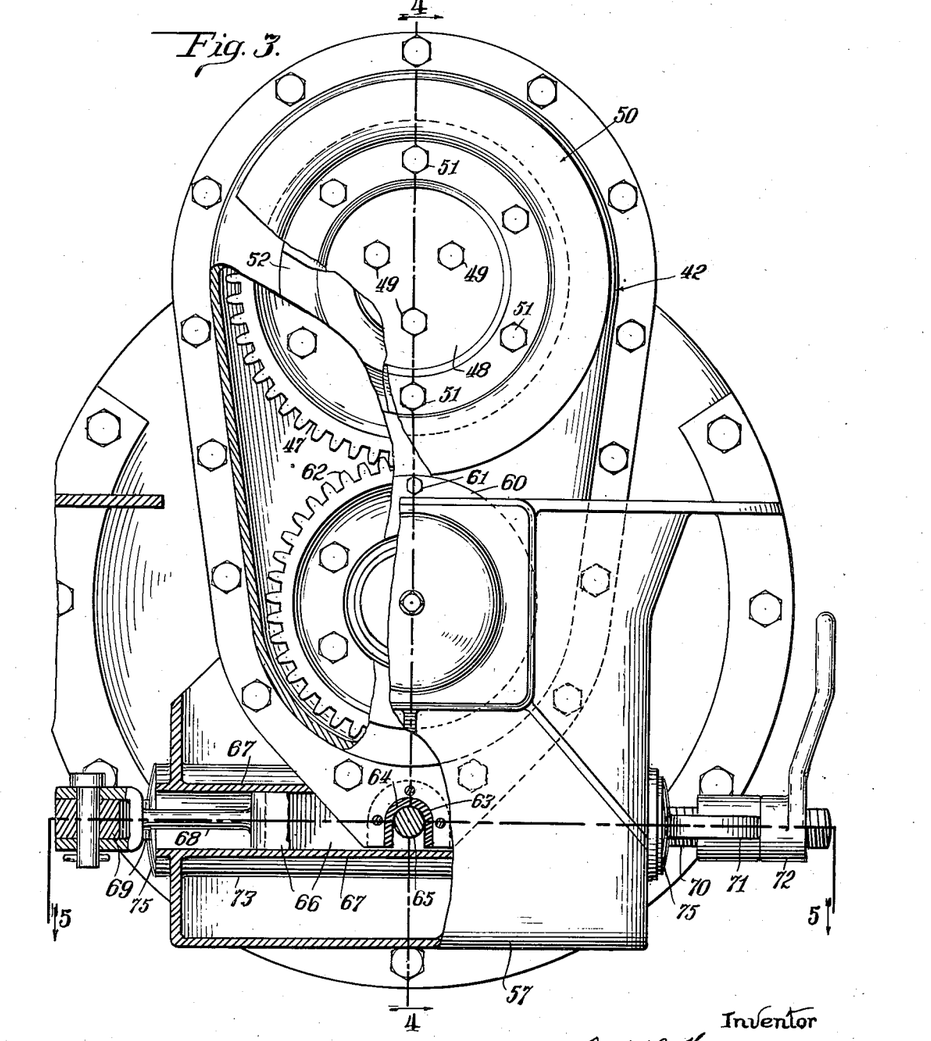
Figure 3 is a side elevation of a modified form of my invention with portions broken away and shown in section to disclose internal construction.
Figure 4:
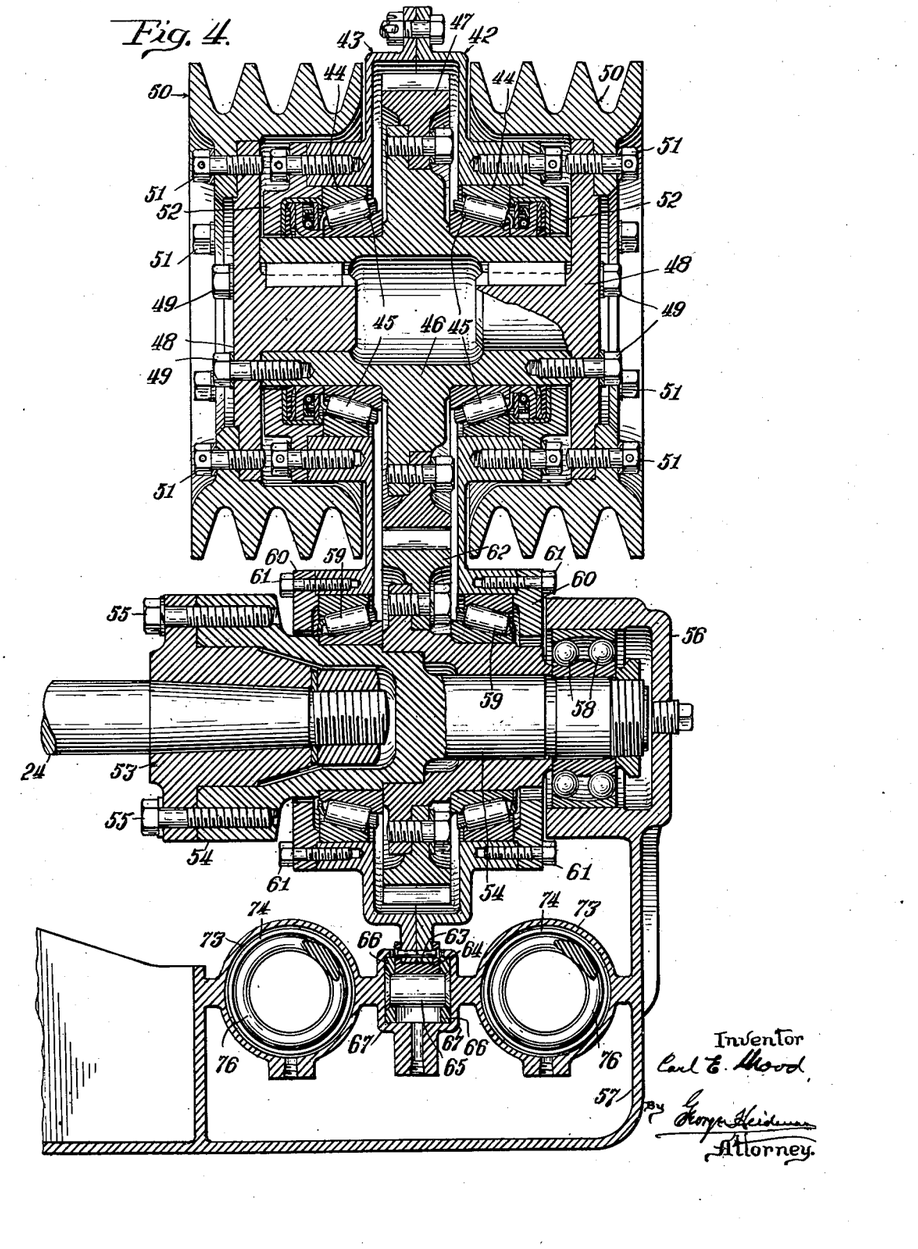
Figure 4 is a vertical sectional view taken on the line 4—4 of Figure 3, looking in the direction of the arrows.
Figure 5:
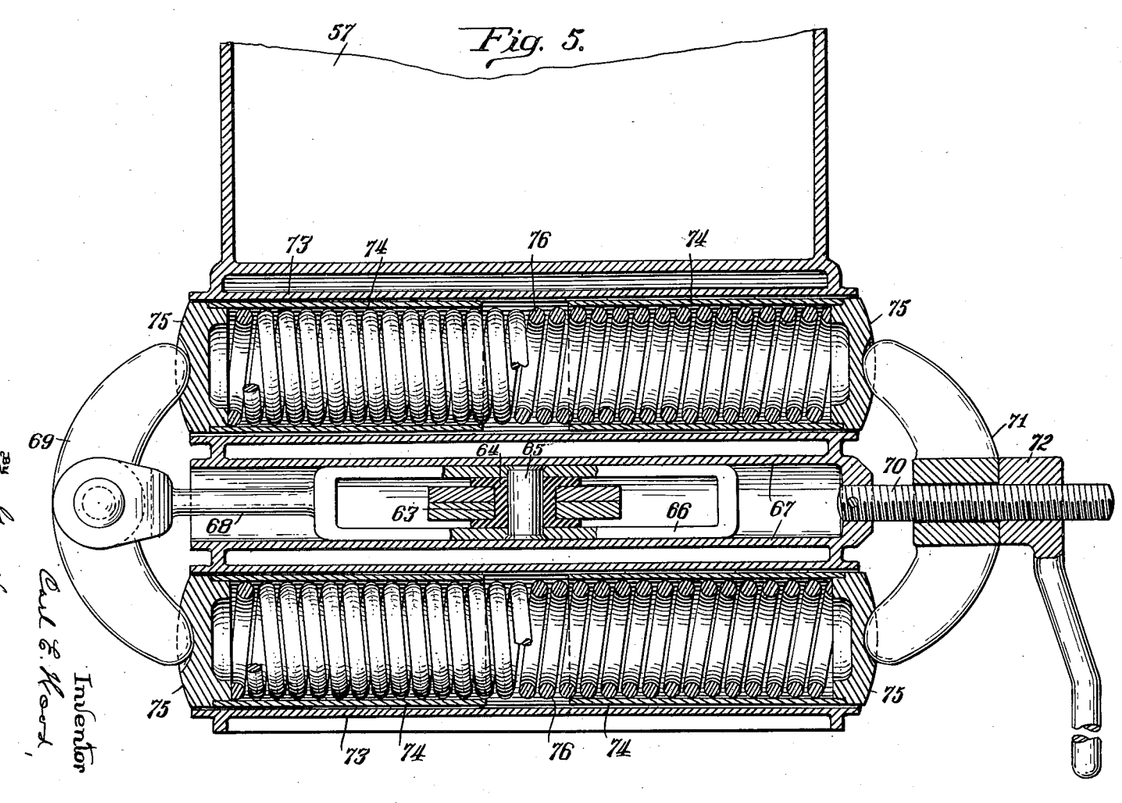
Figure 5 is a cross sectional view taken on the line 5—5 of Figure 3 looking in the direction of of arrows.

In Figures 3, 4 and 5, I illustrate a modification of my invention; the modification relating principally to the method of connecting the armature shaft to the device and in the use of two driven pulleys instead of one as shown in Figure 2.

This structure involves a suitable housing consisting of the two main side walls 42, 43 provided with bearing members 44 for the roller bearings 45, arranged on suitable bearing blocks mounted on the oppositely disposed hub of a wheel or rotatable member 46 to which a ring gear 47 is secured. The ends of the hub of gear carrying member 46 are shown provided with hub plates 48, 48 removably secured to the hub of member 46 by bolts 49; and the perimeters of plates 48, 48 have the belt receiving pulleys 50, 50 secured thereto by bolts 51 so that power from the car axle through the drive belts is transmitted through the pulleys 50, 50 and wheel 46 to the gear 47; it being understood that the pulleys 50, 50 are located on the housing exterior. The bearing members are shown held in place by the cap members or rings 52 which are shown bolted to the casing side walls 42, 43, see Figure 4.

In this construction, the armature shaft 24 is provided with an adapter 53 firmly secured thereto, and this adapter 53 is rigidly secured to the armature shaft extension 54 by bolts 55. The opposite end of the shaft extension 54 is mounted in an outboard bearing 56 formed at the end of a bracket 57 which extends toward and is suitably secured to the head of the generator, not shown, but which is suitably secured to the end sill of the truck frame.

The outboard bearing 56 is shown provided with anti-friction bearings at 58; while the composite housing of the mechanism is rotatively mounted on the shaft extension 54 by suitable roller or anti-friction bearings shown at 59 which are held in place by the annular members or plates 60 removably secured to the casing side walls 42, 43. The side walls 42 and 43 of the main housing are removably secured together by bolts at 61.

The shaft extension 54, intermediate of its ends, is provided with a ring gear 62 bolted thereto, and this gear 62 meshes with the ring gear 47 secured to member 46 which is driven by the two pulleys 50, 50 through the medium of hub plates 48, 48.

The lower end of the housing is provided with a socket, shown more clearly at 63 in Figure 3. The socket is preferably provided with a wear resisting U-shaped insert 64 which straddles a pin 65 carried by a clevis 66. The clevis 66 is slidably mounted in a chamber formed by the elongated tubular portion 67 of the bracket 57 which is adapted to be attached to the head of the generator. The clevis 66 at one end is provided with a stem or draw-bar 68 which extends through the open end of the tubular portion 67 and at its outer bifurcated end has an equalizer yoke 69 pivotally secured thereto; and the opposite or closed end of the tubular portion 67 is provided with a threaded stem 70 on which an adjusting yoke 71 is loosely mounted.

The outer end of stem 70 is provided with an adjusting hand-nut 72 for controlling the position of the adjusting yoke 71 on the threaded stem 70.

The bracket 57 on opposite sides of the clevis slideway is provided with tubular housings 73, 73; the housings 73 and the portion 67 being formed integral with the outboard bearing carrying bracket 57.

Each housing or elongated chamber 73 has a pair of sleeves 74, 74 slidably mounted in the ends of the chambers and the outer ends of the sleeves are closed by caps 75, non-movably seated on the ends of the sleeves.

The sleeves 74 fit about the coil springs 76, whose ends bear against the sleeve caps 75; the correlated sleeves 74 being of less length than the normal length of slightly compressed spring 76 so that the inner ends of said sleeves 74 will be in spaced relation as shown in Figure 5 in order to permit movement of the correlated sleeves toward each other when the springs are to be further compressed.

It is apparent from the construction shown in Figure 4 that the pulley and gear carrying unit or housing is adapted to rotate about the axis of the armature shaft, namely about the shaft extension 54. The degree or extent of rotative or tilting movement of the upper end of the unit is controlled through the medium of the pin 65 carried by the slidable clevis 66; pin 65 being disposed through the socket at the lower tapered end of the pulley and gear carrying housing 42, 43.

The pulleys 50, 50 are intended to receive suitable driving belts which are driven by pulleys arranged on the truck axle and the function of the spring or cushioned connection between the pulley and gear carrying housing and the outboard bearing carrying bracket 57 is to yieldingly provide the required belt tension and also to compensate for distance variations due to relative movement between the drive pulley carrying axle and the generator carrying truck frame.

In the structure shown in Figure 5, the springs 76 76 may be further compressed by screwing hand-nut 72 inwardly on the threaded stem 70, causing yoke 71 to apply greater pressure on the sleeve-caps 75, at the right hand end in Figure 5, forcing the caps and correlated sleeves toward the left which induces the springs 76, through the medium of the sleeves and caps at the left hand end in Figure 5, to exert greater pressure on the equalizer yoke 69 which in turn causes the clevis 66 to be moved to the left in Figure 5. As clevis 66 carries the pin 65 which extends through the socket in the pulley and gear carrying housing, the latter will be rotated or tilted about the axis of the armature shaft, thus causing the pulleys 50, 50 to be yieldingly held at an increased distance from the driven pulley on the axle, thereby increasing the belt tension.

Figure 6:
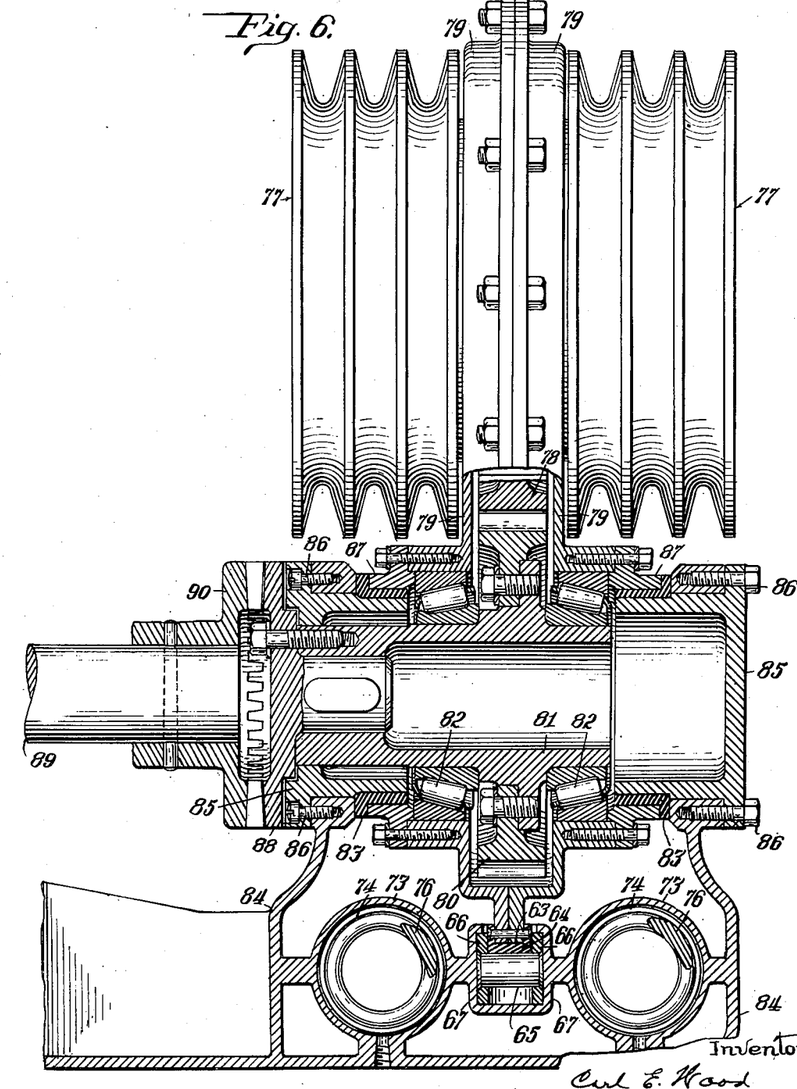
Figure 6 is a sectional elevation of another modified form of my invention.

In Figure 6 I illustrate a modification wherein the hubs of the two belt receiving pulleys 77, 77 are secured in any suitable manner to a gear 78 arranged between the two casing side walls 79, 79; and this casing also encloses a ring gear 80 which is secured to the annular flange on the shaft extension or gear hub 81 which rotatably supports the casing through the medium of the roller bearings 82; the casing also being supported, through the medium of annular bronze bearing 83, by the bracket 84, which is intended to be secured to the head of the generator, and through the medium of a similar annular bronze bearings 83 by the cap and outboard bearing supports 85 carried by the outer end of the bracket 84. The outboard bearing support or cap 85 is preferably removably secured to the bracket by means of screw-bolts 86; and the roller bearing elements are held in place by the ring members 87, 87 which are removably secured to the gear casing.

The outer end of the shaft extension or gear hub 81 is provided with a crown gear 88 which constitutes a portion of a flexible connection between gear hub 81 and the armature shaft indicated at 89 and which is provided with the other portion of the flexible connection or crown gear 90 which meshes with crown gear 88.

This connection compensates for any misalignment between the armature shaft and the shaft extension or gear hub 81.

The bracket 84, in so far as the tension mechanism and method of yieldingly holding the gear housing in adjusted position is concerned, is substantially similar to that shown in Figures 4 and 5; the bracket 84 being provided with the spring housing 73, 73 containing sleeves 74 and springs 76; and also provided with the pin carrying clevis 66 adapted to control the lower end of the gear housing.

Figure 7:
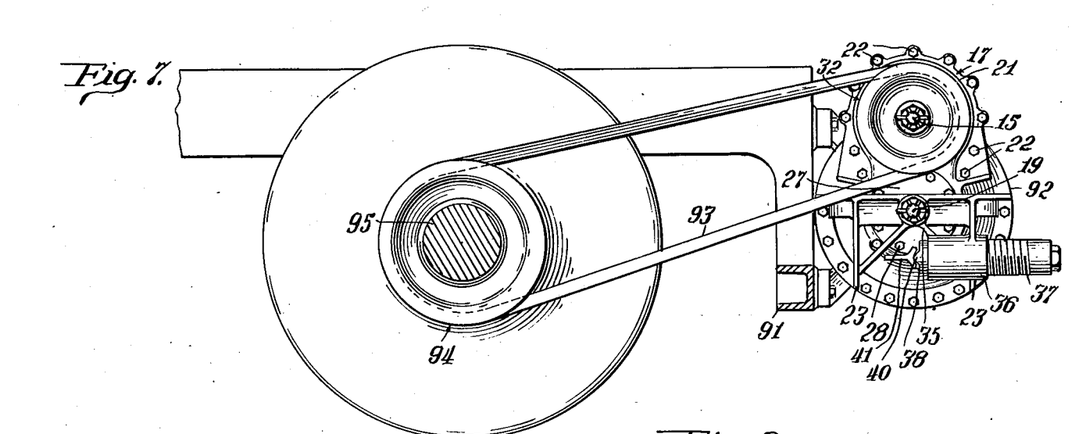
Figure 7 is a sectional elevation of a portion of a car truck taken transversely of the truck axle, illustrating application to the generator-head of the structure shown in Figures 1 and 2.
Figure 8:
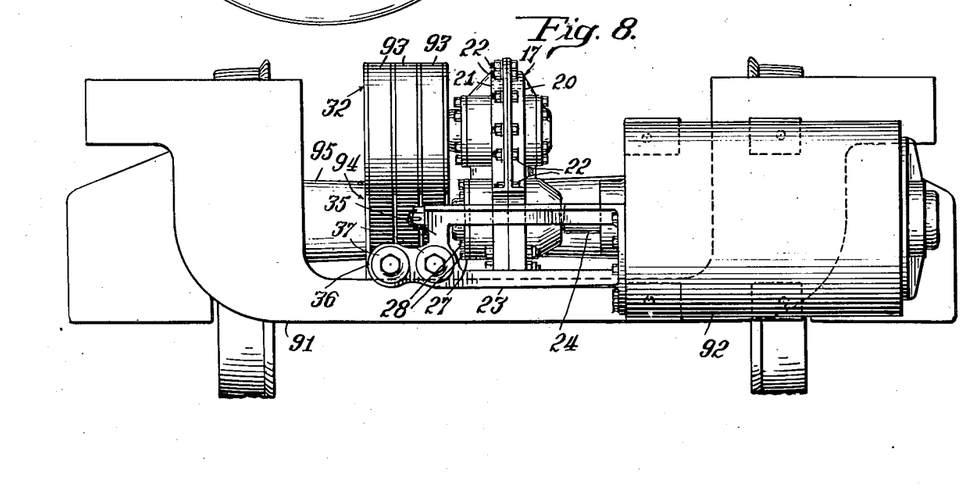
Figure 8 is an end elevation as viewed from the right hand end of Figure 7.

In the exemplifications disclosed in Figures 1, 3 and 6, the pulley and gear carrying housings or units are disposed above the plane of the armature shaft; the general application to a railroad car truck being shown in Figures 7 and 8 with the single pulley type of structure illustrated in Figures 1 and 2. A portion of a truck frame is shown at 91 with the generator indicated at 92 secured to the outer vertical face of the frame end sill and with the supporting bracket 23 bolted to the face or end wall of the generator. The pulley 32 is driven by a plurality of belts 93 which take about pulley 94 mounted on the truck axle 95. It will be understood that the structures disclosed in Figures 3 and 6 are applied in a similar manner; the constructions and arrangement, as shown in Figure 7, permit the use of endless belts 93 by simply jacking up the pulley carrying car axle because the belts do not straddle the end sill of the truck frame; and also enable the belts to be removed and replaced when occasion requires, without necessitating a dismantling of the pulley and gear housing or unit.

As is apparent from the disclosure in Figure 7, the drive belts 93 are yieldingly held taut by the spring caps or cylinders 38 pressing against the bracket 41 of the pulley and gear unit, enabling the belts to yield as the distance between the axle pulley 94 and the driven pulleys vary; a greater belt tension being obtained by screwing cylinder 37 farther into the supporting bracket in the structure shown in Figure 1, or by screwing the hand-nut 72 toward the base-end of threaded stem 70 in the structure shown in Figure 5.

In addition to the exemplifications chosen to illustrate the invention and its adaptation to the driving of a generator from a car axle, my improved tension means is applicable to any situation where power is to be transmitted from a rotating power member to a rotatable driven member through the medium of a flexible driving element; it being understood that modifications in the embodiments shown in the drawings may be possible without, however, departing from the spirit of my invention which has been described in terms employed for purposes of description and not as terms of limitation.

What I claim is:

1. Means of the character described comprising, in combination with an armature-shaft; an armature-shaft extension; a fixedly mounted bracket for supporting said armature shaft extension; a rotatable pulley-carrying member; gearing intermediate of said extension and the pulley carrying member; a gear casing enclosing said armature-shaft extension, said gearing and said pulley-carrying member adapted to swing about said armature-shaft extension; and cushioning means adjustably secured to said fixedly mounted bracket and involving a slidably mounted member adapted to exert pressure on one end of said gear casing whereby the oscillatory movements of the latter will be yieldingly absorbed and the position of the pulley-carrying member relative to the shaft-extension controlled.

2. Means of the character described comprising, in combination with a railroad car truck and a generator mounted thereon; an elongated casing disposed at the outer end of the armature shaft of the generator; a pulley rotatably mounted in one end of the casing; an armature-shaft extension mounted in the other end of the casing; gearing within the casing and operative intermediate of the pulley and the armature-shaft extension; a supporting frame adapted to be rigidly secured to the face plate of the generator adapted to support the outer end of the armature-shaft extension and provided with a cylindrical socket; a cylinder lengthwisely adjustable in the socket; a plunger member slidable in said cylinder; a compression spring in said cylinder normally forcing the plunger member outwardly; means secured to one end of said casing in bearing engagement with the plunger member for controlling the position of said casing; and means whereby the compression of said spring may be regulated.

3. Means of the character described comprising, in combination with a railroad car truck and a generator mounted thereon; a pulley adapted to be driven from the axle of the car truck; a shaft-extension operatively connected with the armature-shaft of the generator; gearing intermediate of the pulley and said shaft-extension; a housing enclosing said gearing and said shaft-extension, provided with anti-friction bearings for the shaft-extension and adapted to oscillate about said shaft-extension; a bracket secured to the generator casing for supporting the outer end of the shaft-extension and provided with an internally threaded socket; an externally threaded cylinder in said socket provided with a cushioning spring; and a plunger member seated on the spring in said cylinder and having operative relation with the end of the housing in which the armature-shaft extension is mounted whereby the oscillations of said housing are controlled.

4. Means of the character described comprising, in combination with a railroad car truck and a generator mounted thereon; an armature shaft extension; a bracket fixedly secured to the generator for supporting the outer end of said shaft-extension; an elongated housing oscillatably mounted at one end of said shaft-extension; a pulley rotatably mounted in the other end of said housing; gearing in the housing operative intermediate of the pulley and the shaft-extension, a cylinder adjustably mounted in said bracket and provided with a compression spring and a plunger member, the plunger member having operative relation with one end of said housing; and means whereby the compression of said spring may be regulated and the position of the pulley gearing end of the housing relative to the vertical axis of the shaft-extension controlled.

5. Means of the character described comprising, in combination with a rotatable shaft extension; a rigidly mounted support for said extension provided with spaced apart sockets; a housing for said extension rotatably mounted thereon; a belt receiving pulley carried by the housing; gearing mounted in the housing intermediate of the axis of the pulley and said shaft extension; compressible spring mechanism mounted in each socket of said rigid support; a clevis member slidably mounted in said support intermediate of said sockets and having operative relation with said housing; and regulable means operative intermediate of the rigid support and the ends of said spring mechanism whereby the tension of the spring mechanism is regulated and the degree of rotative movement of said housing controlled.

6. Means of the character described comprising, in combination with a rotatable shaft extension; a rigidly mounted support for said extension provided with spaced apart sockets; a housing for said extension rotatably mounted thereon; a drive pulley rotatably mounted in one end of the housing; gearing intermediate of the pulley and said shaft-extension; a plurality of sleeve members slidably mounted in opposing relation in the sockets of said rigid support; coil springs arranged in said sleeve members; a clevis member slidably mounted in the support intermediate of the sockets and associated with one end of said housing and with the outer ends of certain of the sleeve members, regulable means carried by said rigid support and operatively connected with the ends of the other sleeve members whereby the springs are placed under compression and the position of said clevis member and of the housing regulated.

7. Means of the character described comprising, in combination with a drive member and a driven member; a housing swingingly mounted on the driven member with the drive member rotatably mounted in its opposite end; a stationarily mounted bracket for the outer end of the driven member; speed ratio mechanism in said housing intermediate of the drive member and the driven member; regulable cushioning means mounted in said bracket; and means intermediate of one end of the housing and said cushioning means whereby the housing is tilted and the drive member yieldingly held to one side of the vertical plane of the driven member.

CARL E. WOOD.